(12) United States Patent
Weber et al.

(10) Patent No.: US 9,616,710 B2
(45) Date of Patent: Apr. 11, 2017

(54) WHEEL BEARING ARRANGEMENT, IN PARTICULAR WHEEL BEARING ARRANGEMENT FOR UTILITY VEHICLES

(75) Inventors: Elmar Weber, Dülmen (DE); Olaf Drewes, Aschaffenburg (DE)

(73) Assignee: SAF-HOLLAND GmbH, Bessenbach (DE)

(*) Notice: Subject to any disclaimer, the term of this patent is extended or adjusted under 35 U.S.C. 154(b) by 252 days.

(21) Appl. No.: 14/110,449

(22) PCT Filed: Mar. 30, 2012

(86) PCT No.: PCT/EP2012/055754
§ 371 (c)(1),
(2), (4) Date: Oct. 8, 2013

(87) PCT Pub. No.: WO2012/139900
PCT Pub. Date: Oct. 18, 2012

(65) Prior Publication Data
US 2014/0028080 A1    Jan. 30, 2014

(30) Foreign Application Priority Data
Apr. 12, 2011   (DE) .................. 10 2011 007 231

(51) Int. Cl.
*B60B 35/08*       (2006.01)
*B60C 23/00*       (2006.01)
*F16C 35/063*      (2006.01)

(52) U.S. Cl.
CPC ............ *B60B 35/08* (2013.01); *B60C 23/003* (2013.01); *F16C 35/063* (2013.01); *B60Y 2200/14* (2013.01)

(58) Field of Classification Search
CPC ....... B60C 23/10; B60C 29/00; B60C 23/003; B60B 35/08
USPC ................................ 152/417, 415, 416, 418
See application file for complete search history.

(56) References Cited

U.S. PATENT DOCUMENTS

| | | | |
|---|---|---|---|
| 1,772,212 A | | 8/1930 | Hurtley |
| 3,887,046 A | * | 6/1975 | Bueler ................ 188/181 A |
| 4,883,106 A | | 11/1989 | Schultz |
| 5,429,167 A | | 7/1995 | Jensen |
| 5,584,949 A | * | 12/1996 | Ingram ................ 152/417 |
| 6,105,645 A | * | 8/2000 | Ingram ................ 152/415 |
| 6,131,631 A | | 10/2000 | Bradley |

(Continued)

FOREIGN PATENT DOCUMENTS

| | | |
|---|---|---|
| CN | 2191779 | 3/1995 |
| DE | 3806322 | 9/1989 |

(Continued)

*Primary Examiner* — Hau Phan
(74) *Attorney, Agent, or Firm* — Price Heneveld LLP

(57) ABSTRACT

A wheel bearing arrangement, in particular wheel bearing arrangement for utility vehicles, comprising a hollow body unit, a securing unit and a stator unit, wherein the hollow body unit has a maximum extent in an axial direction, a pressure space extending substantially in the axial direction, and an end section, wherein the securing unit is secured to the end section, wherein the stator unit is secured to the securing unit, and wherein the stator unit has attachment and sealing means, by means of which a rotor unit can be made to bear against the wheel bearing arrangement in a way which is air-tight and rotatable relative to the stator unit.

8 Claims, 2 Drawing Sheets

(56) References Cited

U.S. PATENT DOCUMENTS

| | | | |
|---|---|---|---|
| 6,145,559 A * | 11/2000 | Ingram, II | 152/417 |
| 6,244,316 B1 * | 6/2001 | Naedler | 152/417 |
| 6,394,159 B1 | 5/2002 | Cobb | |
| 6,435,238 B1 | 8/2002 | Hennig | |
| 7,089,791 B2 * | 8/2006 | Pradier | 73/494 |
| 7,185,688 B2 * | 3/2007 | Hayes et al. | 152/417 |
| 7,731,300 B2 * | 6/2010 | Gerstenslager et al. | 301/108.1 |
| 8,186,403 B2 * | 5/2012 | Sonzala et al. | 152/417 |
| 8,505,600 B2 * | 8/2013 | Padula et al. | 152/417 |
| 2004/0155516 A1 | 8/2004 | Colussi et al. | |
| 2004/0173014 A1 * | 9/2004 | Pradier et al. | 73/146 |
| 2004/0238093 A1 | 12/2004 | Nelson et al. | |
| 2005/0194079 A1 * | 9/2005 | Hennig | 152/417 |
| 2009/0241655 A1 | 10/2009 | Ingram et al. | |

FOREIGN PATENT DOCUMENTS

| | | |
|---|---|---|
| DE | 10302444 | 5/2006 |
| EP | 1099574 | 5/2001 |
| EP | 1714803 | 10/2006 |
| EP | 1736327 | 12/2006 |
| WO | 9624498 | 8/1996 |
| WO | 9808698 | 3/1998 |

* cited by examiner

WHEEL BEARING ARRANGEMENT, IN PARTICULAR WHEEL BEARING ARRANGEMENT FOR UTILITY VEHICLES

FIELD OF THE INVENTION

The present invention relates to a wheel bearing arrangement, in particular a wheel bearing arrangement for utility vehicles or commercial vehicles.

BACKGROUND

Wheel bearing arrangements for commercial vehicles are well known in the prior art. Systems which make it possible to regulate the inflation pressure of commercial vehicles during operation are also known. However, problems arise when it comes to integrating the complex and sensitive systems for regulating the inflation pressure into existing wheel bearing arrangements on commercial vehicles since, for example, additional lines in the undercarriage region of the commercial vehicle have to be provided. These lines are subjected to an increased danger of damage by bodies hitting the undercarriage of the commercial vehicle during travel.

SUMMARY OF THE INVENTION

Therefore, the object of the present invention is to provide a wheel bearing arrangement which makes it possible to easily integrate an inflation pressure regulation system on the commercial vehicle while achieving the high safety standards for commercial vehicles.

According to the invention, the wheel bearing arrangement comprises a hollow body unit, a securing unit and a stator unit, wherein the hollow body unit has a maximum extent in or along an axial direction, a pressure space extending substantially along or in the axial direction and an end section, wherein the securing unit is secured to the end section, wherein the stator unit is secured to the securing unit, and wherein the stator unit has attachment and sealing means, by which a rotor unit can be made to bear against or be attached to the wheel bearing arrangement in a way which is air-tight and rotatable relative to the stator unit. Preferably, the hollow body unit is, for example, a preferably rigid or steerable axle of a commercial vehicle, which achieves its maximum extent along or in an axial direction A. Advantageously, the hollow body unit is designed as a hollow body or a tube-shaped body with variable inner and outer diameters along the axial direction. At a first end in the axial direction, the hollow body unit comprises an end section. In the end section there is secured a securing unit on the hollow body unit, wherein on the hollow body unit and on the securing unit there are provided respective means for securing the two units to each other. Furthermore, the hollow body unit comprises a pressure space which preferably serves for guiding a fluid, particularly preferably air, within the hollow body unit. It is advantageous to seal the pressure space by respective sealing means such that it may withstand pressures of up to 15 bar, however, of at least 6 bar. The stator unit is secured to the securing unit and comprises attachment and sealing means for attaching or sealing a rotor unit bearing against or attached to the stator unit. The stator unit is characterized in that a first end thereof is adjacent to the pressure space and that a second end thereof, opposite the first end, may bear against or be attached to the rotor unit. The stator unit is secured relative to the securing unit and to the hollow body unit, i.e., it may not twist or displace relative to the hollow body unit or the securing unit, respectively. The rotor unit to be attached to the stator unit, by contrast, is rotatably supported relative to the hollow body unit, the securing unit and the stator unit. Preferably, the rotor unit is secured to further rotating assemblies of the wheel bearing arrangement. For connecting the rotor unit and the stator unit air-tightly, the stator unit comprises sealing means which preferably seal sufficiently even if the two parts to be sealed with respect to each other move relative to one another. It may be advantageous to use labyrinth seals, profile sealing rings or lamellar seals. Preferably, the stator unit comprises a recess or a through bore extending along the axial direction, through which the compressed air may flow from the pressure space into the stator unit and from there further into the rotor unit. In this way, it is possible that compressed air from the fixed hollow body unit or from the fixed pressure space, respectively, flows into the rotor unit via the stator unit and in this way may pass into the rotating part of the wheel bearing arrangement. In particular, thus, by applying an air pressure to the pressure space or by feeding compressed air into the pressure space it is possible to monitor and control the inflation pressure in the tires of a commercial vehicle. It is preferred that the pressure from the vehicle tire via the rotor unit, the stator unit and the pressure space may flow uninhibitedly up to a control unit or pump unit attached to the pressure space. With the help of the monitoring unit, it is preferably possible to directly determine the inflation pressure in the tire at any given time since the pressure in the tire, in the case of an uninhibited flow of the components flown-through, equals the pressure upstream of the monitoring unit. Furthermore, in the monitoring unit, certain target values for the tire pressure may be stored, which are compared to the currently measured inflation pressure, and respective measures are taken. Advantageously, the monitoring unit comprises an interface with the pump unit, wherein the pump unit increases or decreases the air pressure in the system upon a command of the monitoring unit.

In a preferred embodiment, the hollow body unit adjacent to the end section comprises a bearing portion, wherein in or on the bearing portion there is supported on the hollow body unit a bearing arrangement, which may be tensioned by the securing unit against displacement relative to the hollow body unit. Preferably, the hollow body unit thus performs a second task, namely accommodating a bearing arrangement and tensioning the same. Preferably, the bearing arrangement serves for securing a rotor or a rotating assembly against displacement relative to the hollow body unit and for supporting it rotatably relative to the hollow body unit. The rotating component which is to be supported rotatably about the hollow body unit may be a wheel hub with a brake disc or a brake drum, for example. In order to accommodate the bearing arrangement, the hollow body unit comprises a bearing portion which preferably is arranged on the outside, i.e. at an end of the hollow body unit adjacent to the end section. The bearing portion, in addition, comprises a projection pointing towards the inside in the axial direction towards the center of the hollow body unit, on which the bearing arrangement may be preferably attached. The bearing arrangement is thus secured against shifting or displacement along the axial direction towards the center of the hollow body unit. At the outer end of the hollow body unit, in the end section, the securing element preferably engages respective threads or similar attachment means, applies a force in the axial direction towards the center of the hollow body unit, and thus secures the bearing arrangement against displacement towards the outside along the axial direction. Preferably, the bearing arrangement is an anti-friction bearing such as a tapered roller bearing, a ball bearing or a cylindrical roller bearing, which may preferably transmit forces in the axial direction and transversely thereto in the radial direction and thus secures the rotating component of the wheel bearing arrangement both in the radial direction and in the axial direction. The securing unit preferably is attached to the inner ring of an anti-friction bearing, which ring is fixed or supported non-rotatably relative to the hollow body unit, and applies a force thereon. This function, which is to be fulfilled by the securing unit, is preferably comparable to the function of a wheel nut or axle nut or axle bolt which directly or by means of one or a plurality of distance pieces secures one or a plurality of bearings against shifting in the axial direction. In order to be able to apply the required tension force on the bearing arrangement, the securing unit preferably is connected to the end section of the hollow body unit by means of a thread. This thread preferably may be an external thread on the hollow body unit in combination with an internal thread on the securing unit. In further preferred embodiments, it is also possible to provide an internal thread on the hollow body unit in combination with an external thread on the securing unit. Preferably, the type of thread provided is a self-sealing thread such as a sealing metric ISO thread, in this way the contact surface between the hollow body unit and the securing unit, to a certain degree, may be designed air-tight. Furthermore, it is preferred that the thread by means of which the securing unit is secured to the hollow body unit is self-tensioning or has a tight fit.

In a particularly preferred embodiment, the pressure space is a recess or a cavity in the hollow body unit, wherein the pressure space is limited at a first end by a supply nozzle and at a second end by a securing unit and the stator unit. Preferably, thus, the recess according to the invention in the hollow body unit is identical to the pressure space. Said embodiment is preferably characterized in that no further constructive changes or attached parts have to be provided, except for an opening in the hollow body unit, which is provided with a supply nozzle, and a second opening on the hollow body unit, to which the securing unit and the stator unit are attached. It is preferred to design the hollow body unit, for example, the rigid axle of a wheel suspension system for commercial vehicles, as a tube-shaped component. In this way, it is particularly easy to use the space within the hollow body unit, which space is available as a pressure space or pressure line for compressed air. Preferably, it is avoided to provide external lines in the area of the vehicle undercarriage, and the safety of the system for monitoring and controlling the inflation pressure is significantly increased. It is also preferred to provide sealing elements which are arranged both on the compressed air supply, i.e., in the area of the supply nozzle, and on the compressed air withdrawal, and/or in the area of the securing unit or the stator unit. Preferably, said sealing elements are static seals, i.e., seals between two parts which do not move relative to one another. Preferably, conventional sealing elements such as O-rings or profile sealing rings may be used. Advantageously, in the area of the supply nozzle there is inserted a recess in the hollow body unit and provided with a thread, wherein the supply nozzle, on which an external thread is provided, may be screwed into the recess. It is preferably possible to attach to the supply nozzle a compressed air line by means of which the compressed air flows into the hollow body unit. The inner walls of the hollow body unit limiting the pressure space within the hollow body unit are to be designed such that also moisture-containing air may come into contact with the inner walls without risking damage to the hollow body unit. Preferably, to this end, there is provided a corrosion-decreasing coating or a surface treatment on the inner surfaces of the hollow body unit. In a further preferred embodiment, the hollow body unit comprises a plurality of recesses which are not in communication with one another, wherein the pressure space is provided in one of said recesses.

In a further preferred embodiment, the pressure space is designed as a pressure line, wherein the pressure line is arranged in the recess of the hollow body unit, and wherein the pressure space is limited at a first end by a supply nozzle and at a second end by the stator unit. Preferably, there is provided a pressure line which is arranged within the recess in the hollow body unit, and which extends from the supply nozzle up to the stator unit. It may be further preferred that the pressure line is guided from the outside through an opening or recess in the hollow body unit into the cavity in the hollow body unit and within the hollow body unit extending up to the stator unit. An advantage of said embodiment is that the outlay of sealing the hollow body unit is considerably smaller than where the entire recess in the hollow body unit would serve as a pressure space and, corresponding to the end section of the hollow body unit, would have to be sealed against a through-flow of air. If the pressure space is located in the pressure line, preferably only the contact surface between the stator unit and the pressure line or the contact surface between the pressure line and the supply nozzle, respectively, needs to be sealed. However, it may be further preferred that when using a pressure line within the hollow body unit the contact surfaces at the end section or at the supply nozzle, respectively, have to be sealed against the through-passage of a fluid, i.e., air or moisture, in order to thus reduce corrosion inside of the hollow body unit. The pressure line preferably is a flexible pressure hose such as a coated or armored rubber hose reinforced by metal or plastic fibers or a hose braided of metal or plastic and provided inside with an air-tight rubber lining. Further preferably, the pressure line may also be a metal tube or a pressure line made of polyamide without inlays. By preferably laying the pressure line within the hollow body unit, the pressure line is considerably better protected against damage from whirled-up foreign matter in the region of the undercarriage of the commercial vehicle than if it were freely arranged. Consequently, by providing the pressure line in the hollow body unit, it is possible to considerably increase the safety of the system for supplying compressed air.

In a particularly preferred embodiment at the contact surface between the end section and the securing unit, there is provided an end section sealing element. By providing said sealing element between the end section of the hollow body unit and the securing unit, it is prevented that compressed air escapes through gaps formed between the end section and the securing unit. Said sealing is preferably required in case the hollow body unit or the recess in the hollow body unit is used as pressure space. In this case, it has to be ensured, on the one hand, that the compressed air will not escape in an uncontrolled manner via the contact surface between the end section and the securing unit, and further that no compressed air is applied to possibly adjacent assemblies, such as the bearing arrangement, which may possibly cause damage in said assemblies. Since the securing unit is preferably secured and supported non-rotatably relative to the hollow body unit or the end section thereof, the seal may be a static seal. Preferably, a seal such as an O-ring or a profile seal made of vulcanized rubber or of silicone-like or caoutchouc-containing materials.

It is advantageous that the securing unit comprises a first attachment portion and a second attachment portion, wherein the first attachment portion may be secured at the end section and secures the securing unit against displacement relative to the hollow body unit, and wherein the second securing portion secures the stator unit concentrically to the axial direction and secures it against displacement relative to the hollow body unit. The first attachment portion is, preferably, that attachment portion that is secured by means of a thread or similar attachment means to the end section of the hollow body unit. Preferably, the first attachment portion has an extent essentially along the axial direction and is designed like a sleeve, for example. The outer surface of the first attachment portion is preferably designed as a hexagon so that by means of suitable tools a torque may be transmitted to the securing unit or to the first attachment portion of the securing unit in order to rotate the latter and in order to secure the securing element to the end section by means of said rotation. It is advantageous if the first attachment portion has a contact surface with the bearing arrangement and transmits a force to the bearing arrangement via said contact surface in order to tension the bearing arrangement at the hollow body unit. But it is preferably also conceivable to use also various intermediate pieces or distance pieces or washers which are pressed from the first attachment portion of the securing unit in the direction of the bearing arrangement and which, in turn, tension the latter against the hollow body unit. The second attachment portion extends essentially in the radial direction. Preferably, the second attachment portion resembles a disc or plate, wherein the second attachment portion is connected or attached to the first attachment portion at the outer edge thereof. In addition, the second attachment portion has suitable means for accommodating the stator unit, wherein there is particularly preferably provided a recess in the second attachment portion, which recess is engaged by the stator unit. Particularly preferably, there is provided in the recess of the second attachment portion a thread into which the stator unit may be screwed by means of a suitable external thread provided thereon. In a preferred embodiment, the second attachment portion is designed as a disc which is pressed by the first attachment portion against the hollow body unit, wherein at the contact surface between the second attachment portion and the hollow body unit there may be provided a seal which prevents that compressed air escapes from the pressure space. The concentric arrangement of the stator unit relative to the axial direction is particularly important since the stator unit is connected to a rotating component of the rotor unit, wherein the axial direction is the axis of rotation. An eccentric support of the stator unit would lead to a translatory movement of the rotor unit and damage resulting therefrom.

Preferably, the second attachment portion protrudes into the recess of the hollow body unit. In this preferred embodiment, the second attachment portion comprises an inner section which extends essentially in the axial direction and thus protrudes into the recess on the hollow body unit. This may be preferred, in particular, in case the building space at the end of the hollow body unit is limited and parts protruding to the outside or protruding out of the hollow body unit have to be avoided.

In a particularly preferred embodiment, the securing unit is a single piece. Preferably, the securing unit is designed as a single integral component, consisting of the first and the second attachment portions. Said component may be produced by casting or forging, for example, preferably, after a cathodic dip coating is performed, and the blank is then surface-finished. It may also be preferable to design the securing unit and the stator unit as a single integral piece. It is thus possible to reduce the sealing outlay when attaching the individual parts to each other.

It is further preferred that the stator unit is designed as a single integral piece with the second attachment portion of the securing unit. Preferably, in this embodiment, it is possible to use a conventional nut or wheel nut as the first attachment portion of the securing unit which presses a unit which is designed single-piece from the second attachment portion and stator unit against the hollow body unit. This reduces the construction and manufacturing outlay and, thus, lowers the costs.

Advantageously, at the securing unit there is provided a ventilation recess. The ventilation recess relieves the pressure on the system or on the pressure room, in particular, in case the pressure is too high. Preferably, the ventilation recess is arranged such that compressed air which was able to pass the seal between the end portion and the securing unit does not pass into the bearing portion but is vented to the environment via the ventilation recess. Thus, the ventilation recess represents a safety element which ensures that the safe operation of the wheel bearing arrangement is not influenced by leaking compressed air which passes into the bearing portion.

Further advantages and features result from the following exemplary description of preferred embodiments of the wheel bearing arrangement according to the invention with reference to the appended drawings. Different features of various embodiments may be combined within the framework of the invention.

DETAILED DESCRIPTION OF THE PREFERRED EMBODIMENTS

Figure 1:
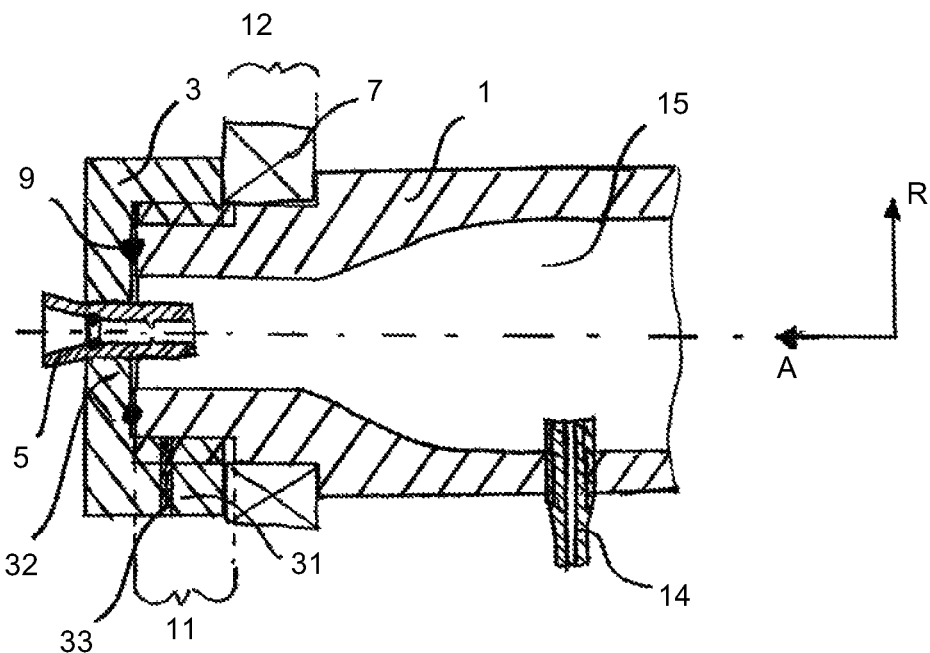
FIG. 1 shows a sectional view of a first preferred embodiment of the wheel bearing arrangement according to the invention.

FIG. 1 shows a preferred embodiment of the wheel bearing arrangement according to the invention, wherein the wheel bearing arrangement comprises a hollow body unit 1, a securing unit 3, a stator element 5, a bearing arrangement 7 and a supply nozzle 14. Inside of the hollow body unit 1 there is provided a recess or cavity, wherein the recess may be limited towards the right-hand side of the Figure (not shown in the Figure). In the embodiment shown in FIG. 1, the recess of the hollow body unit 1 simultaneously serves as pressure space 15. The latter is limited by the inner wall of the hollow body unit 1, the supply nozzle 14, the securing unit 3 and the stator unit 5. It is preferred that the hollow body unit 1 is an axis-symmetric component which, in mirrored arrangement, comprises the features shown in the Figure at the left-hand side towards the right-hand side. Thus, preferably at each end of the hollow body unit 1 there may be arranged a securing unit 3 and a stator unit 5, wherein both are connected to one another by a recess inside of the hollow body unit 1. The supply nozzle 14 in this preferred embodiment serves for guiding compressed air into the pressure space 15, i.e. into the recess within the hollow body unit 1, wherein said compressed air reaches the stator and rotor units 5 provided at either side of the hollow body unit 1. The hollow body unit 1 comprises an end portion 11 at the end which is shown on the left-hand side in the Figure, wherein in said end portion 11 the securing unit 3 is secured to the hollow body unit 1. This is done by means of a thread in the preferred embodiment. On the outside of the hollow body unit 1 there is provided an external thread, and on the inside of the securing unit 3 there is provided an internal thread, which engage each other and serve for applying a force along axis A in the direction indicated by the arrow. By means of this force along axis A, the securing unit 3 secures the bearing arrangement 7 to the hollow body unit 1. The securing unit 3 comprises two portions: the first attachment portion 31 which serves for securing the securing unit 3 to the hollow body unit 1, and the second securing portion 32 which serves for coaxially securing the stator unit 5 along axis A. In the embodiment shown in FIG. 1, the first and the second attachment portions 31, 32 are designed as a single integral piece. In the second attachment portion 32 of the securing unit 3, there is provided a recess into which the stator unit 5 may be inserted. This recess preferably includes a thread so that the stator unit 5 may be screwed into the second attachment portion 32 of the securing unit 3 by means of a corresponding thread. The stator unit 5, in turn, includes at its inside suitable seals and projections which make it possible to attach a rotor unit—which is not shown in the Figure—to the stator unit 5 and to air-tightly connect it thereto. Via the rotor unit, the compressed air may pass from the pressure space 15 into the stator unit 5, and via the rotor unit up to further rotating parts of the wheel bearing arrangement. In order that the air present in the pressure space 15 may escape only via the stator and the rotor unit 5, there is provided a seal 9 which is located between the hollow body unit 1 and the securing unit 3. The seal 9 is preferably an O-ring made of rubber or a similarly elastically deformable material. Furthermore, there is provided on the securing unit 3 a ventilation recess 33 which, in case that the seal 9 fails, the compressed air may not pass into the bearing portion 11 or towards the bearing arrangement 7, but is beforehand vented to the environment via the ventilation recess 33. Preferably, it is also possible to provide on the ventilation recess 33 a sensor element which detects whether compressed air flows to the ventilation recess 33, which would indicate that the seal 9 is no longer fully functional. The supply nozzle 14 is preferably screwed into the hollow body unit 1 by means of a thread. To this end, there is provided on the hollow body unit 1 a recess with an internal thread which may be engaged by an external thread provided on the supply nozzle 14 and which, thus, secures the supply nozzle to the hollow body unit. Furthermore, the supply nozzle 14 has suitable geometries, which preferably serve for securing a pressure line on the supply nozzle 14 and to guide, via said pressure line, compressed air into the supply nozzle 14, which, in turn, guides the compressed air into the pressure space 15.

Figure 2:
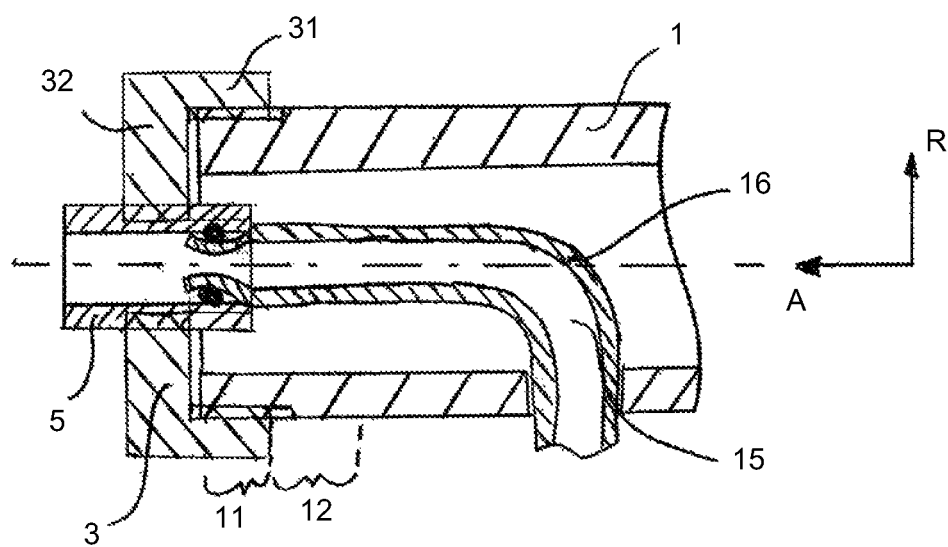
FIG. 2 shows a further sectional view of a preferred embodiment of the wheel bearing arrangement according to the invention.

FIG. 2 shows a preferred embodiment of the wheel bearing arrangement with a pressure line 16. In this preferred embodiment, the pressure space 15 is not identical to the recess in the hollow body unit 1, but is located inside of a pressure line 16. The pressure line 16 is preferably a flexible pressure hose or a rigid metal line, one end of which touches the stator unit 5 and the second end of which projects through the wall of the hollow body unit 1 and extends to a pump unit and is secured thereto. The pressure line 16 is sealed against the stator unit 5 using suitable sealing elements, for example as is indicated in FIG. 2, by means of O-rings on the contact surface between the pressure line 16 and the stator unit 5. Instead of the pressure line 16 shown in FIG. 2, which passes through a recess in the wall of the hollow body unit 1, the pressure line may also be attached to a supply nozzle 14, as is shown in FIG. 1, wherein on the supply nozzle 14 there may be attached a further pressure line 16 from the outside. An advantage of the embodiment shown in FIG. 2 is that no pressure is applied to the recess in the hollow body unit 1 and, consequently, it is not necessary to use much outlay to prevent that compressed air escapes, for example at the contact surface between the hollow body unit 1 and the securing unit 3.

Figure 3:
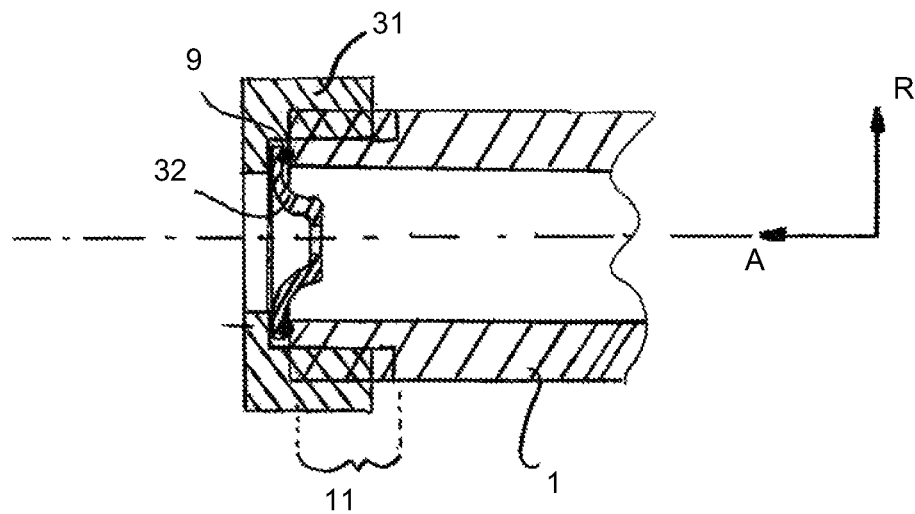
FIG. 3 shows a further sectional view of a preferred embodiment of the securing unit and of the hollow body unit.

FIG. 3 shows a preferred embodiment of the securing unit 3 which is attached to the hollow body unit 1. Here, the securing unit 3 is designed two-piece, wherein the first attachment portion 31 is secured to the hollow body unit 1 and simultaneously presses the second attachment portion 32 against a contact surface with the hollow body unit 1. The second attachment portion 32 preferably is designed as a disc-shaped or cone-shaped flat metal disc which comprises a recess concentric to axis A. The stator unit 5 may be arranged in and secured to said recess. The second attachment portion 32 is pressed against the hollow body unit 1 by the first attachment portion 31 which has a suitable geometry in the form of a projection or a flange, for example. At the contact point between the second attachment portion 32 and the hollow body unit 1 there is provided a sealing element 9 which seals tightly by means of the contact force which is transmitted from the first attachment portion 31 to the second attachment portion 32. It may be further preferred to design the second attachment portion 32 and the stator unit 5 as a single integral piece, wherein said assembly then, in turn, is simply pressed against the hollow body unit 1 by means of a nut with a flange, in accordance with the embodiment shown in FIG. 3.

Figure 4:
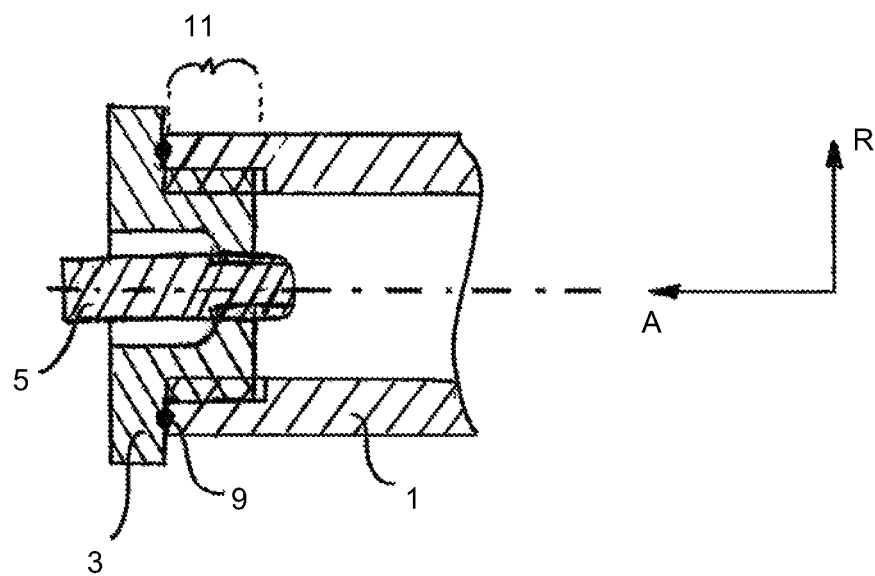
FIG. 4 shows a sectional view of a further preferred embodiment of the securing unit and of the hollow body unit.

FIG. 4 shows a further preferred embodiment of the securing unit 3, wherein the securing unit 3 is designed as a single integral piece. Furthermore, the securing unit 3 comprises an external thread, which preferably is screwed into an internal thread provided to this end on the hollow body unit 1. It is possible to screw the stator unit 5 into a recess on the securing unit 3, which is aligned concentrically to axis A. Preferably, at the contact surface between the hollow body unit 1 and the securing unit 3 there is provided a sealing element 9.

The invention claimed is:
1. A wheel bearing arrangement for utility and commercial vehicles, the wheel bearing arrangement comprising:
 a hollow body unit, a securing unit and a stator unit;
 wherein the hollow body unit includes a maximum extent along an axis, a pressure space extending substantially along the axis, and an end section;
 wherein the securing unit is fixedly secured to the end section of the hollow body unit;
 wherein the stator unit is secured to the securing unit;
 wherein the stator unit includes an attachment and sealing means, such that a rotor unit at least bears against a wheel-bearing arrangement in an air-tight, rotatable configuration relative to the stator unit, and wherein the hollow body unit adjacent to the end section includes a bearing portion;

wherein the bearing portion supports a bearing arrangement on the hollow body unit, and wherein the bearing arrangement is selectively tensioned by the securing unit against displacement relative to the hollow body unit; and wherein the securing unit is a single integral piece.

2. The wheel bearing arrangement of claim 1, wherein the pressure space is one of a recess and a cavity in the hollow body unit; and wherein the pressure space is limited at a first end by a supply nozzle and at a second end by the securing unit and the stator unit.

3. The wheel bearing arrangement of claim 1, wherein the pressure space is designed as a pressure line;

wherein the pressure line is arranged in a recess of the hollow body unit; and wherein the pressure line is limited at a first end by a supply nozzle and at a second end by the stator unit.

4. The wheel bearing arrangement of claim 1, further comprising:

an end section sealing element provided between the end section and the securing unit.

5. The wheel bearing arrangement of claim 1, wherein the securing unit comprises a first attachment portion and a second attachment portion;

wherein the first attachment portion is selectively secured to the end section to secure the securing unit relative to the hollow body unit; and wherein the second attachment portion secures the stator unit relative to the hollow body unit and concentric to the axis.

6. The wheel bearing arrangement of claim 5, wherein the second attachment portion extends into a recess of the hollow body unit.

7. The wheel bearing arrangement of claim 1, wherein the stator element and the second attachment portion of the securing unit are portions of a single integral piece.

8. The wheel bearing arrangement of claim 1, wherein the securing unit defines a ventilation recess.

* * * * *